July 19, 1960 M. A. MEYER 2,946,016

ALL-PASS NETWORK AMPLIFIER

Original Filed Oct. 26, 1954

INVENTOR
MAURICE A. MEYER

BY Joseph Weingarten
ATTORNEY

United States Patent Office

2,946,016

Patented July 19, 1960

2,946,016

ALL-PASS NETWORK AMPLIFIER

Maurice A. Meyer, Natick, Mass., assignor to Laboratory For Electronics, Inc., Boston, Mass., a corporation of Delaware

Original application Oct. 26, 1954, Ser. No. 464,697. Divided and this application Mar. 12, 1956, Ser. No. 571,037

11 Claims. (Cl. 330—69)

This invention relates in general to phase-shift circuits and in particular to a novel all-pass circuit which imparts a selected phase-shift to an input signal functionally related to its frequency, the amplitude of the output signal being substantially independent of frequency.

This application is a division of the co-pending application of Maurice A. Meyer entitled, Frequency and Phase Sensitive Apparatus, Serial No. 464,697, filed October 26, 1954.

All-pass networks, having amplitude and phase-shift characteristics which are respectively, independent of and dependent upon frequency, are well known in the art; however, the design of predetermined phase-shift characteristics frequently involve numerous complex computations which yield a network configuration of non-standard circuit parameters requiring careful adjustment to provide the desired all-pass characteristic.

Accordingly, it is a primary object of the present invention to provide a relatively simple all-pass circuit which may be designed to have a predetermined phase-shift characteristic as a function of frequency with a minimum number of computations and which may be readily constructed without requiring critical adjustment of circuit parameters.

Another object of the invention is to provide an all-pass network having a selected phase-shift characteristic and providing an output signal having an amplitude independent of frequency, extending down to zero frequency.

A further object of the invention is to provide an all-pass network having a phase-shift characteristic which is controlled by a simple RC circuit.

Basically, the invention comprises a differential amplifier having first and second inputs appropriately energized. A first impedance couples an input terminal to a first input of the differential amplifier, the input terminal being resistively coupled to the second input thereof. The output of the differential amplifier is coupled to the second input by a feedback impedance. By appropriate choice of circuit parameters, the foregoing circuit arrangement provides an all-pass characteristic having the desired phase-shift relation.

These and other objects and advantages will become apparent from the following specification when read in connection with the accompanying drawing in which.

Figure 2:
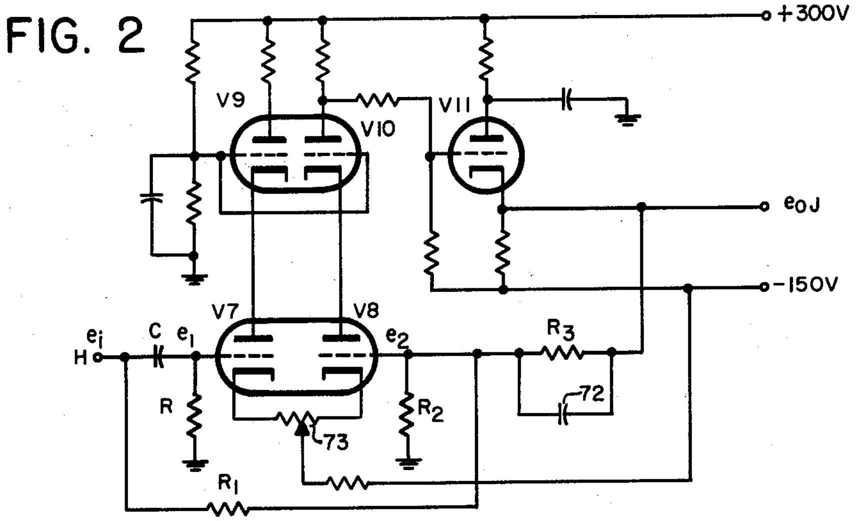
Fig. 2 is a complete schematic circuit diagram of the preferred embodiment of the invention.

The accompanying drawing is a reproduction of Figs. 7 and 8 of the aforementioned co-pending application.

Accordingly, the the reference characters there used are carried over into the present application.

Referring now to Fig. 1A, a schematic diagram shows the basic principles of the novel all-pass phase-shift network. In the following discussion it will be shown that the complex voltage ratio $$\frac{e_0}{e_i}$$

has an amplitude characteristic independent of frequency, shown in Fig. 1B, and the phase-shift characteristic as a function of frequency of Fig. 1C.

To simplify the analysis of the circuit, capacitor C will be considered zero at first and the principle of superposition applied, first finding the output $e_0$ at terminal J for $e_1=0$, $e_i=e_i$; and then, $e_1=e_1$, $e_i=0$.

From an examination of Fig. 1A, $e_2$, the second input to the differential amplifier may be expressed:

$$e_2=\left[\frac{\frac{R_2R_3}{R_2+R_3}e_i}{\frac{R_2R_3}{R_2+R_3}+R_1}\right]-\left[\frac{Ge_2\frac{R_1R_2}{R_1+R_2}}{\frac{R_1R_2}{R_1+R_2}+R_3}\right]$$

$$e_2\left[1+\frac{\frac{GR_1R_2}{R_1+R_2}}{\frac{R_1R_2}{R_1+R_2}+R_3}\right]=e\frac{R_2R_3}{R_2R_3+R_1R_2+R_1R_3}$$

where G is the gain of the differential amplifier.

$$e_2(R_1R_2+R_1R_3+GR_1R_2)=e_iR_2R_3-e_2R_2R_3$$

$$e_2=\frac{R_2R_3e_i}{(1+G)R_1R_2+R_1R_3+R_2R_3}$$

The output is $$-Ge_2=\frac{-Ge_iR_2R_3}{(1+G)R_1R_2+R_1R_3+R_2R_3}$$

Now if $R_1 \approx R_2$ and $GR_1>>R_3$, then the output $$e_{o1}\approx -e\frac{R_3}{R_1}$$

where $e_{o1}$ is the output for the first case.

For the second case $e_i=0$, $e_1=e_1$ and $R_1$ is in parallel with $R_2$ then:

$$e_2=\frac{\frac{R_1R_2}{R_1+R_2}G(e_1-e_2)}{\frac{R_1R_2}{R_1+R_2}+R_3}=\frac{R_1R_2G(e_1-e_2)}{R_1R_2+R_1R_3+R_2R_3}$$

or $$e_2[R_1R_2(1+G)+R_1R_3+R_2R_3]=Ge_1R_1R_2$$

or $$e_2=\frac{Ge_1R_1R_2}{(R_1R_2)(1+G)+R_1R_3+R_2R_3}$$

$$e_{o2}+G(e_1-e_2)=Ge_1\left[\frac{R_1R_2+R_1R_3+R_2R_3}{R_1R_2(1+G)+R_1R_3+R_2R_3}\right]$$

where $e_{o2}$ is the output for the second case. Using the same approximations as before when $R_1 \approx R_2$ and $GR_1>>R_3$, $$e_{o2}\approx e_1\left[1+R_3\left(\frac{R_1+R_2}{R_1R_2}\right)\right]\approx\frac{\frac{R_1R_2}{R_1+R_2}+R_3}{\frac{R_1R_2}{R_1+R_2}}e_1$$

If $$\frac{\frac{R_1R_2}{R_1+R_2}+R_3}{\frac{R_1R_2}{R_1+R_2}}=2\frac{R_3}{R_1}$$

the combined output $$e_{o1}+e_{o2}=e_o\approx(2e_1-e_i)\frac{R_3}{R_1}$$

This requires:

$$1+R_3\frac{R_1+R_2}{R_1R_2}=2\frac{R_3}{R_1}\text{ or }1=\left[2-\frac{R_1+R_2}{R_2}\right]\frac{R_3}{R_1}$$

or calling $$\frac{R_3}{R_1}$$

the all-pass gain H, $$\frac{R_2-R_1}{R_2}=\frac{1}{H};\ R_2=\frac{H}{H-1}R_1$$

Now if terminal H is driven from a low-impedance source, $$e_i=e_i\text{ and }e_1=\frac{Re_i}{R+\frac{1}{j\omega C}}=\frac{j\omega e_i}{j\omega+\frac{1}{RC}}$$

$$e_o=\left[\frac{2j\omega e_i}{j\omega+\frac{1}{RC}}-e_i\right]H=He_i\frac{j\omega-\frac{1}{RC}}{j\omega+\frac{1}{RC}}$$

and $$\frac{e_o}{e_i}=H\frac{j\omega-\frac{1}{RC}}{j\omega+\frac{1}{RC}}$$

yielding the all-pass characteristic shown in Fig. 1B and Fig. 1C.

Instead of C we substitute an arbitrary impedance, $Z_1(j\omega)$, and intead of R use a $Z_2(j\omega)$, then:

$$e_1=\frac{Z_2(j\omega)e_i}{Z_1(j\omega)+Z_2(j\omega)}\text{ and }\frac{e_o}{e_i}=H\frac{Z_2(j\omega)-Z_1(j\omega)}{Z_2(j\omega)+Z_1(j\omega)}$$

This permits an all-pass characteristic to be obtained with the circuit herein disclosed provided $Z_2$ and $Z_1$ are properly chosen. For a description of a procedure for properly choosing these impedances, reference is made to a paper entitled, "Design of RC Wide-Band 90-Degree Phase-Difference Network" by D. K. Weaver, appearing in the proceedings of the I.R.E., April 1954. For example, Fig. 1D shows a modification of the circuit illustrated in Fig. 1A. In the modified circuit, the capacitor C and resistor R exchange positions. An all-pass characteristic as shown in Fig. 1B and Fig. 1C is provided except that the phase of the output signal leads that of the input signal whereas a lagging characteristic is represented in Fig. 1C.

Figure 1:
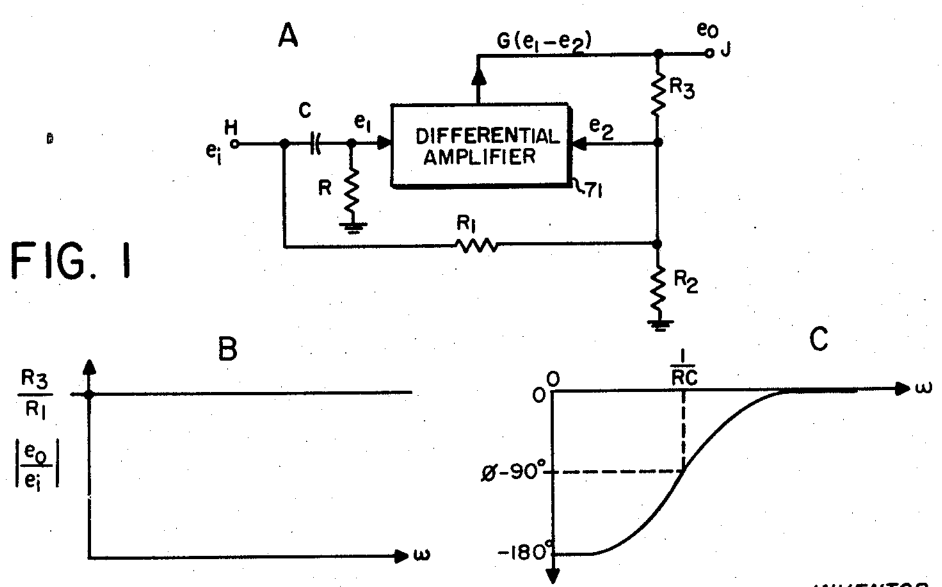
Fig. 1A is a combined block-schematic circuit diagram of one form of the all-pass circuit.
Figs. 1B and 1C illustrate the amplitude and phase characteristics of the circuit of Fig. 1A.
Fig. 1D is a variation of the circuit shown in Fig. 1A.
Figure 1D:
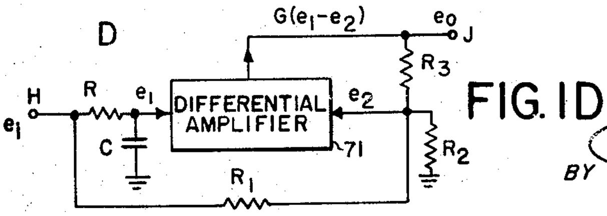

The preceding discussion of Fig. 1 should facilitate the understanding of the corresponding schematic circuit diagram shown in Fig. 2 to which the reference symbols of Fig. 1 are carried over.

Referring now to Fig. 2, it is apparent from Fig. 1C that resistor R and capacitor C control the shape of the phase-shift characteristic.

Differential amplifier 71 comprises V7, V8, V9, V10, and V11. V10 and V9 act as plate load resistors for V7 and V8 to help maintain stable D.-C. amplification. V11 is a cathode follower which permits the output at terminal J to be taken at low impedance. Capacitor 72 provides an alternating current negative feedback path for gain stabilization and reduction of distortion. Potentiometer 73 balances the amplifier and is adjusted so that $e_o=0$ when $e_i=0$.

Thus the phase-shift amplifier herein disclosed provides the characteristics of an all-pass network with a highly stabilized gain down to D.-C. Numerous modifications of and departures from the specific embodiment described herein may be practiced by those skilled in the art without departing from the disclosed inventive concepts. Consequently, the invention is to be construed as limited only by the spirit and scope of the appended claims.

What is claimed is:

1. An all-pass circuit comprising, differential combining means having first and second inputs and an output, frequency-sensitive attenuating means for coupling an input signal to said first input, means for attenuating said input signal by a factor of substantially two and applying the attenuated signal to said second input, and means for feeding back a portion of the output signal from said output to said second input.

2. An all-pass phase-shift network comprising, an input terminal, a differential amplifier having first and second inputs, a common terminal, a first frequency-sensitive impedance connected between said input terminal and the first input of said differential amplifier, a second impedance connected between said first input and said common terminal, a first resistance connected between said input terminal and the second input to said differential amplifier, a second resistance connected between said second input and said common terminal, and a third resistance coupling the output of said differential amplifier to the second input thereof, said first and second resistances being approximately equal and the product of the gain of said differential amplifier and said third resistance being markedly greater than the value of said second resistance.

3. Apparatus as in claim 2, wherein said first impedance is a capacitor, and said second impedance is a resistor.

4. Apparatus as in claim 2, wherein said first impedance is a resistance and said second impedance is a capacitance.

5. Apparatus for providing an output signal at an output terminal in response to an input signal, the relative phase between and amplitude ratio of said input and output signals being respectively dependent upon and independent of the input signal frequency, comprising, first means for attenuating said input signal by a factor dependent upon its frequency to provide a first attenuated signal, second means for attenuating said input signal by a factor of substantially two independent of its frequency to provide a second attenuated signal, and means for differentially combining said first attentuated signal with the cumulative combination of said second attenuated signal and a portion of the signal appearing at said output terminal, the output of said differential combining means being coupled to said output terminal.

6. Apparatus for providing an output signal in response to an input signal, the relative phase between and ratio of said signals being respectively dependent upon and independent of the input signal frequency, comprising, a differential amplifier having first and second inputs and an output, a resistive attenuator having a gain of substantially one-half for coupling said input signal to said second input, a frequency sensitive attenuating network for coupling said input signal to said first input, and a feedback impedance between said output and second input.

7. Apparatus for providing an output signal in response to an input signal, the relative phase between an amplitude ratio of said signals being respectively dependent upon and independent of the input signal frequency, comprising, an input terminal, a differential amplifier having first and second inputs and an output, a common terminal, a frequency-sensitive attenuating network connected between said input terminal and said common terminal and coupling said input terminal to said first differential amplifier input, a frequency-insensitive attenuating network having a gain of substantially one-half connected between said input terminal and said common terminal and coupling said input terminal to said second differential amplifier input, and a substantially frequency-insensitive feedback impedance coupling said differential amplifier output to said second differential amplifier input.

8. Apparatus in accordance with claim 7 wherein said frequency-sensitive attenuating network is a resistance serially-connected to a capacitance.

9. Apparatus in accordance with claim 8 wherein said differential amplifier comprises, first, second, third and fourth electron tubes each having at least a plate, grid and cathode, a resistance common to the cathode circuit of said first and second electron tubes, said grids of said first and second electron tubes comprising said first and second differential amplifier inputs respectively, said cathodes of said third and fourth electron tubes being respectively connected to the plates of said first and second electron tubes, respective load resistances coupled to said plates of said third and fourth electron tubes, and a cathode follower for coupling said plate of said fourth electron tube to said differential amplifier output.

10. An all-pass phase-shift circuit comprising, an input terminal, a high gain differential amplifier having first and second inputs and an output, a common terminal, a frequency-sensitive attenuating network connected between said input terminal and said common terminal and coupling said input terminal to said first differential amplifier input, a first resistance connected between said input terminal and said second differential amplifier input, a second substantially equal resistance connected between said second differential amplifier input and said common terminal, and a third resistance connected between said output and said second differential amplifier input, the ratio of said third resistance to said first resistance being substantially equal to the ratio of the difference between said first and second resistances to said second resistance.

11. An all-pass circuit providing an output signal at an output terminal comprising, a frequency-sensitive attenuating network energized by an input signal to provide a first signal, means for attenuating said input signal by a factor of substantially two to provide a second signal, means for differentially combining said first signal and a signal formed by combining said second signal and a signal derived from said output terminal, the output of said differential combining means being coupled to said output terminal.

References Cited in the file of this patent

UNITED STATES PATENTS

| | | |
|---|---|---|
| 2,587,919 | Straus et al. | Mar. 4, 1952 |
| 2,677,729 | Mayne | May 4, 1954 |
| 2,747,028 | Clark | May 22, 1956 |
| 2,748,201 | McMillan | May 29, 1956 |
| 2,775,657 | Van Zelst | Dec. 25, 1956 |
| 2,780,682 | Klein | Feb. 5, 1957 |
| 2,796,468 | McDonald | June 18, 1957 |
| 2,846,522 | Brown | Aug. 5, 1958 |
| 2,863,122 | Finkel et al. | Dec. 2, 1958 |

OTHER REFERENCES

Lukaszewicz: A Simplified Solution . . . of Algebraic Polynomials, Bulletin de L'Academie Polonaise des Sciences (1953) Cl. IV, vol. 2, No. 3, pages 103 to 107.